US006301255B1

(12) United States Patent
Park

(10) Patent No.: US 6,301,255 B1
(45) Date of Patent: Oct. 9, 2001

(54) ATM SWITCHING SYSTEM FOR MULTICAST DATA COMMUNICATION

(75) Inventor: Seong-Yong Park, Seongnam (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/995,995

(22) Filed: Dec. 22, 1997

(30) Foreign Application Priority Data

Dec. 21, 1996 (KR) .................................................. 96-69640

(51) Int. Cl.⁷ .............................. H04J 3/24; H04L 12/56
(52) U.S. Cl. .......................... 370/399; 370/432; 370/474
(58) Field of Search .................................... 370/389, 390, 370/392, 395, 396, 397, 398, 399, 409, 412, 417, 418, 428, 429, 432, 474

(56) References Cited

U.S. PATENT DOCUMENTS

| 5,202,885 | 4/1993 | Schrodi et al. . | |
|---|---|---|---|
| 5,229,991 | 7/1993 | Turner . | |
| 5,305,311 | 4/1994 | Lyles . | |
| 5,365,519 | * 11/1994 | Kozaki et al. | 370/378 |
| 5,410,540 | 4/1995 | Aiki et al. . | |
| 5,436,893 | 7/1995 | Barnett . | |
| 5,459,724 | 10/1995 | Jeffrey et al. . | |
| 5,541,915 | 7/1996 | Storm . | |
| 5,577,035 | * 11/1996 | Hayter et al. | 370/395 |
| 5,608,726 | * 3/1997 | Virgile | 370/401 |
| 5,701,300 | * 12/1997 | Jeon et al. | 370/392 |
| 5,825,767 | * 10/1998 | Mizukoshi et al. | 370/395 |
| 5,898,687 | * 4/1999 | Harriman et al. | 370/390 |
| 5,917,819 | * 6/1999 | Yang et al. | 370/390 |
| 5,923,654 | * 7/1999 | Schnell | 370/390 |

* cited by examiner

Primary Examiner—Kwang B. Yao
(74) Attorney, Agent, or Firm—Robert E. Bushnell, Esq.

(57) ABSTRACT

An asynchronous transfer mode (ATM) switching system includes a cell switching assembly having at least one switch port for transferring an ATM cell, and a subscriber board having a plurality of subscriber ports. A cell processing apparatus for use in the ATM switching system includes a look-up memory for storing control information for determining whether to copy an ATM cell from the switch port, and a cell copy controller for copying the ATM cell from the switch port and transferring ATM cells copied to the subscriber ports according to the control information stored in the look-up memory. If the ATM cell is a point-to-point communication cell, the ATM switching system translates the header included in the cell according to control information and transfers the ATM cell having the translated header to at least one of the subscriber ports. However, if the ATM cell is a point-to-point communication cell, the ATM switching system selects the subscriber ports based on the translated header and transfers the cell of which header is separated to the selected subscriber ports.

7 Claims, 7 Drawing Sheets

ATM SWITCHING SYSTEM FOR MULTICAST DATA COMMUNICATION

CLAIM FOR PRIORITY

This application makes reference to, incorporates the same herein, and claims all benefits accruing under 35 U.S.C. §119 from an application for APPARATUS AND METHOD FOR PROCESSING ATM CELLS IN ATM SWITCHING SYSTEM earlier filed in the Korean Industrial Property Office on the $21^{st}$ of December 1996, and there duly assigned Ser. No. 69640/1996, a copy of which application is annexed hereto.

BACKGROUND OF THE INVENTION

1. Technical Field

The present invention relates to an asynchronous transfer mode (ATM) switching system suitable for multicast data communication, and more particularly to an apparatus and method for processing ATM cells for use in a subscriber board of the ATM switching system.

2. Related Art

Generally, ATM is a specific packet-oriented transfer mode using an asynchronous time division multiplexing technique where both line switching and packet switching are unified and many pieces of information such as voice, data, and pictures are organized in fixed-sized blocks, called cells. ATM can operate as both a packet exchange system and a circuit exchange system in one transmission mode for efficiently embodying both high speed and wide band communication networks. For this reason, ATM is a target transfer mode solution for implementing a broadband integrated services digital network (B-ISDN) because it offers an effective information channel management based upon virtual path and virtual channel identifiers ("VPI" and "VCI") placed in a header of each cell which facilitates the use of a multiplex, de-multiplex and exchange of digital information, and serves to decrease the costs of broad-band communication network facilities because of its flexibility in a bandwidth distribution.

Typically, data communication will be in the form of singlecast, which is a point-to-point connection. An example of singlecast data communication is a normal two-party telephone call. The voice of one caller is transferred to the other party and no other. In many broadband integrated services digital networks (B-ISDN), there is increasingly a need for multicast data communication, a point-to-multipoint connection, in which the same data to sent simultaneously to selected stations in the network. The extreme of multicast is broadcast, in which all stations receive the same data, in the same way that television and radio transmissions are broadcasts. An example of multicast data communication is a video conference in a CATV system.

In the case of a point-to-point ATM connection, cells are relayed from the source to the target without being duplicated or copied, while in a multicast connection, cells from the source are duplicated within the network and then separately routed to each destination in turn. In ATM multicast as disclosed, for example, in U.S. Pat. No. 5,202,885 for ATM Exchange With Copying Capability issued to Schrodi et al., U.S. Pat. No. 5,229,991 for Packet Switch With Broadcasting Capability For ATM Networks issued to Turner, U.S. Pat. No. 5,305,311 for Copy Network Providing Multicast Capabilities In A Broadband ISDN Fast Packet Switch Suitable For Use In A Local Area Network issued to Lyles, U.S. Pat. No. 5,410,540 for Shared-Buffer-Type ATM Switch Having Copy Function And Copy Method Thereof issued to Schrodi et al., U.S. Pat. No. 5,435,893 for ATM Cell Switch Suitable For Multicast Switching issued to Barnett, U.S. Pat. No. 5,459,724 for ATM Switching Arrangement issued to Jeffrey et al., and U.S. Pat. No. 5,541,915 for Method For Point-To-Multipoint Connections In Self-Routing ATM Switching Networks issued to Storm, the cells must not only be duplicated in the ATM switch, but must also have the correct VPI/VCI assigned to the header for each copy of the cell. The VPI/VCIs will be different for each cell, since the destinations will all be different. A cell head translation apparatus is typically used to assign different VPI/VCI with respect to the respective copied ATM cell. The cell header translation apparatus copies the cell as many as the number of the output points by means of a switching circuit for routing the cells to the output ports, and determines the output ports based on a copy identification number and the original VPI/VCI. Then, the cell header translation apparatus translates a header of the cells into the VPI/VCI required at the output ports, and transfers the cells with the translated header to the output ports. However, in case that a plurality of subscribers (medium and low-speed subscribers) each being smaller than the maximum capacity of the switch are connected to one switch port, such a copy network may not provide the point-to-multipoint communication service.

For example, in case that the ATM switching system has a subscriber network with a switch port to which 64 E1-class subscribers SAE1 or 3 DS3-class subscribers SAD3 are connected, ATM cells copied from one signal source should be transferred to the output ports of the same switch. In such a situation, since two or more cells can not be transferred at the same time to the same output port, only one of the cells is selectively transferred and the remaining cells are fed back to be buffered. In case of 64 E1-class subscribers SAE1, only one of the cells is transferred and the remaining 63 cells should be buffered simultaneously, thereby unavoidably disusing the remaining cells. Therefore, routing information based on a look-up using the respective headers should be necessarily provided in order to rout one of three cells in case of DS3-class connection, or one of 64 cells in case of E1-class connection to the designated subscriber ports.

SUMMARY OF THE INVENTION

Accordingly, it is therefore an object of the present invention to provide a cell processing apparatus for use in a subscriber board of an ATM switching system for transferring ATM cells copied from one signal source to subscriber ports without disuse of the ATM cells copied.

It is also an object to provide a cell processing apparatus for use in a subscriber board of an ATM switching system for processing ATM cells, in which an ATM cell is transferred to only one of subscriber ports even when routing information based on a look-up table using a header is not provided.

These and other objects of the present invention can be achieved by a cell processing apparatus of an ATM switching system comprising a cell switching assembly having at least one switch port for transferring an ATM cell, and a subscriber board having a plurality of subscriber ports each having a plurality of subscriber output buffers. The cell processing apparatus includes a look-up memory for storing control information for determining whether to copy an ATM cell from the switch port; and a cell copy controller for copying the ATM cell from the switch port and transferring the cells copied to the subscriber ports according to the control information stored in the look-up memory. Both the look-up memory and the cell copy controller are incorporated in the subscriber board.

The cell copy controller translates a header of the cell based on the control information stored in the look-up memory, and transfers the cell having the translated header to at least one of the subscriber ports according to the control information. The cell copy controller separates the translated header and a remaining payload and transfers the separated header and payload to the respective subscriber ports, when transferring the cell having the translated header. The cell copy controller generates write signals for the respective subscriber ports to temporarily store the remaining cells into the corresponding subscriber output buffers and thereafter to transfer the remaining cells to the subscriber ports, when transferring the separated header and remaining cells to the subscriber ports.

According to another aspect of the present invention, a cell processing method of an asynchronous transfer mode switching system including a cell switching assembly having at least one switch port for transferring an ATM cell, and a subscriber board having a plurality of subscriber ports, includes the steps of: determining whether a cell from the switch port is a point-to-point communication cell or a point-to-multipoint communication cell; demultiplexing the cell to transfer the demultiplexed cell to a predetermined one of the subscriber ports, if the cell is the point-to-point communication cell; and copying the cell to transfer the cells copied to at least one of the subscriber ports, if the cell is the point-to-multipoint communication cell.

Further, the ATM switching system checks a check bit of the header included in the cell to determine whether the cell from the switch port is the point-to-point communication cell or the point-to-multipoint communication cell. If the cell is the point-to-point communication cell, the ATM switching system translates the header included in the cell according to control information and transfers the cell having the translated header to at least one of the subscriber ports. However, if the cell is the point-to-multipoint communication cell, the ATM switching system selects the subscriber ports based on the translated header and transfers the cell of which header is separated to the selected subscriber ports.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
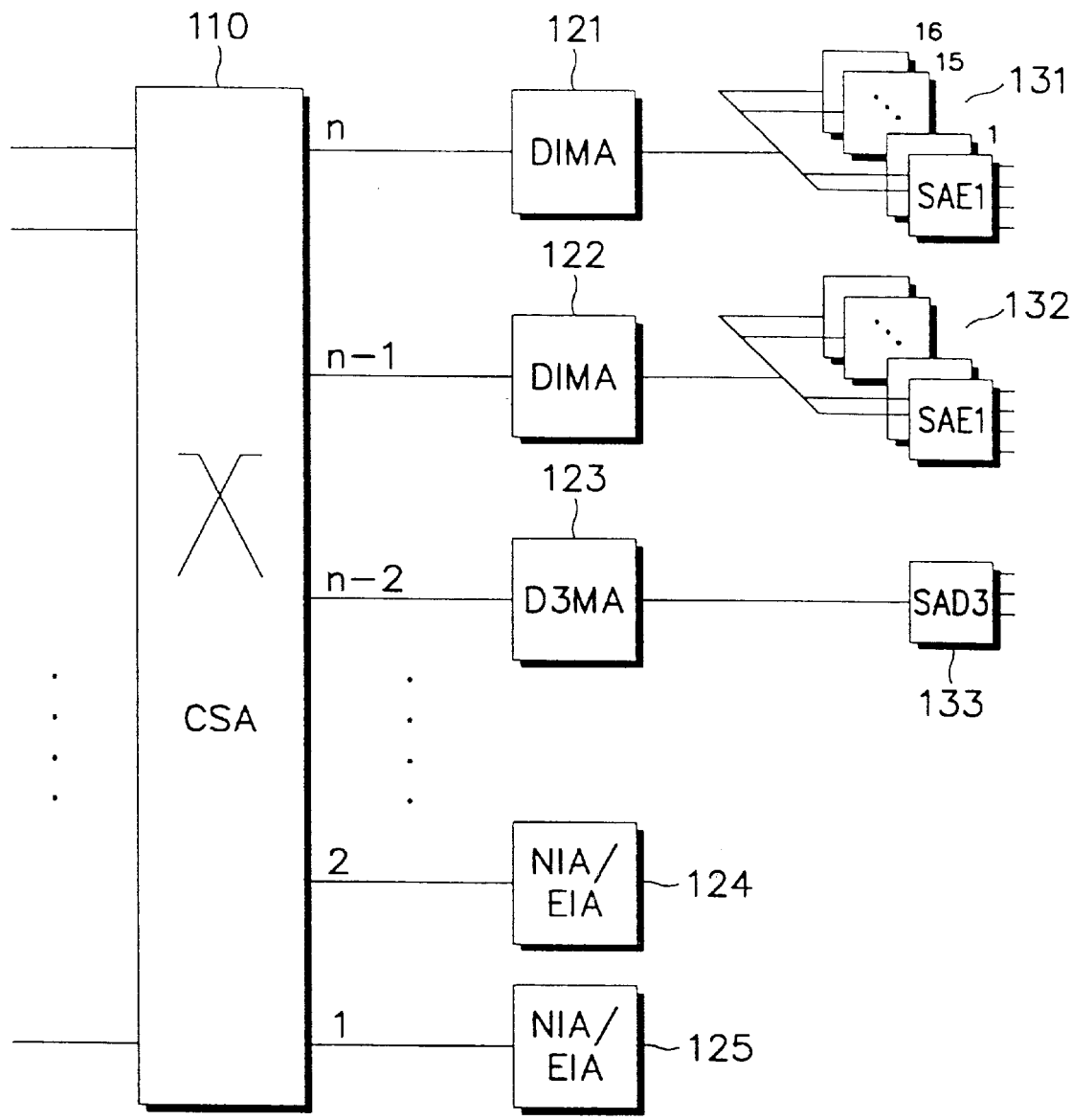
FIG. 1 is a block diagram of a general asynchronous transfer mode (ATM) switching system.

Referring now to the drawings and particularly to FIG. 1, which illustrates an ATM switching system for multicast data communication. As shown in FIG. 1, the ATM switching system includes a cell switching assembly (CSA) 110, a first set of multiplexers/demultiplexers (D1MA) 121 and 122 for a point-to-point communication with E1-class subscribers through subscriber boards (SAE1) 131 and 132, a second set of multiplexer/demultiplexer (D3MA) 123 for a point-to-multipoint communication with DS3-class subscriber through subscriber board (SAD3) 133. ATM cells copied from one signal source must be transferred to the output ports of the same switch. In such a situation, since two or more cells can not be transferred at the same time to the same output port, only one of the cells is selectively transferred and the remaining cells are fed back to be buffered. For example, in case of 64 E1-class subscribers SAE1, only one of the cells is transferred and the remaining 63 cells should be buffered simultaneously, thereby unavoidably disusing the remaining cells. Therefore, routing information based on a look-up using respective headers must be necessarily decided inrder to rout one of three cells in case of DS3-class connection, or one of 64 cells in case of E1-class connection to the designated subscriber ports.

Figure 2:
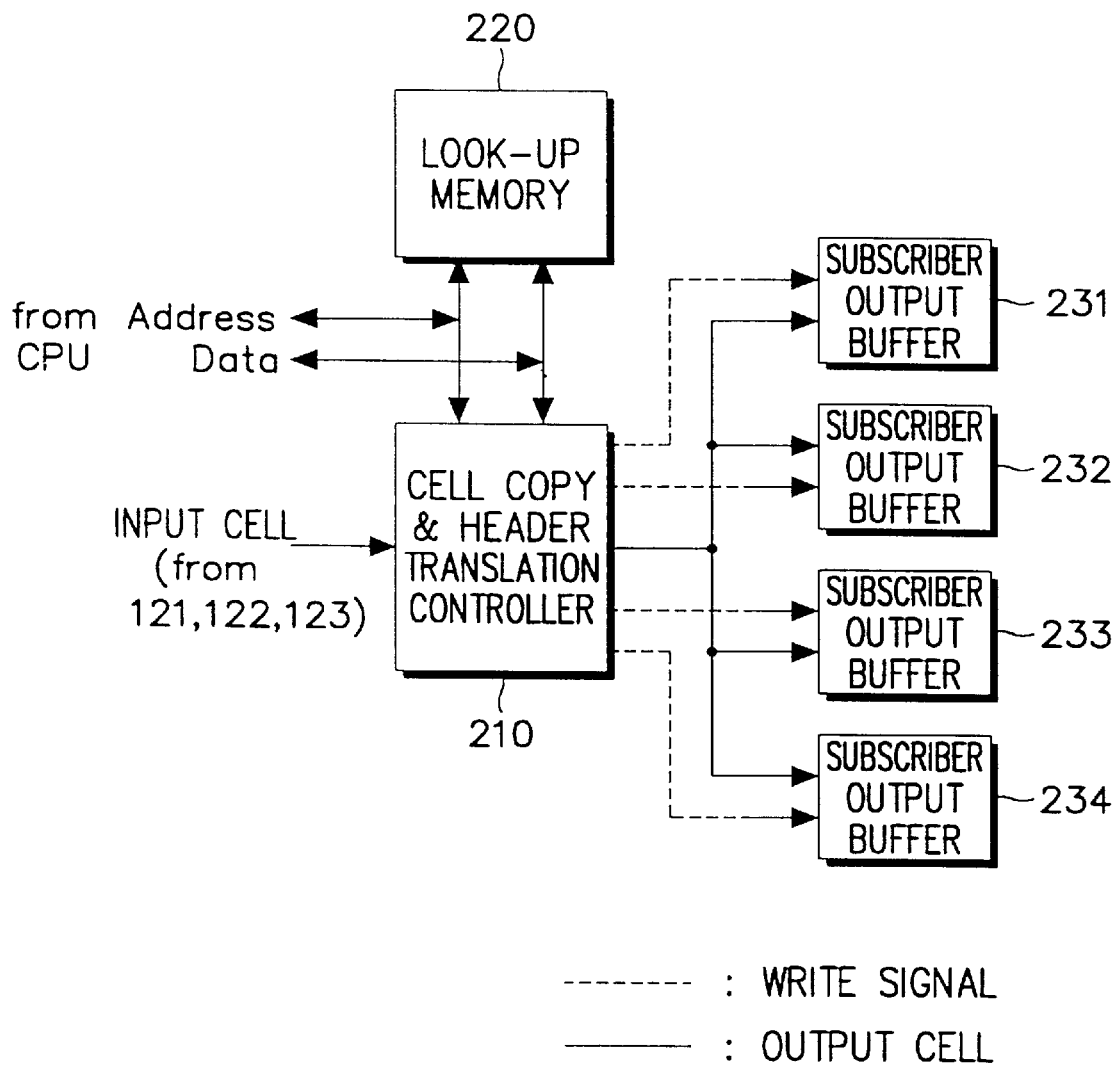
FIG. 2 is a block diagram of a cell processing apparatus as incorporated in a subscriber board of the ATM switching system according to the principles of the present invention.

Turing now to FIG. 2, which illustrates a cell processing apparatus as incorporated in a subscriber board of the ATM switching system according to the principles of the present invention. Generally, the cell processing apparatus determines whether an ATM cell is a multicast cell, and transfers the copied cells to the respective subscriber ports and then translates the header based on control information stored in a look-up memory, when the ATM cell is a multicast cell. As shown in FIG. 2, the cell processing apparatus includes a cell copy and header translation controller 210, a look-up memory 220, and a plurality of subscriber output buffers 231 to 234.

The cell copy and header translation controller 210 has the functions of demultiplexing a singlecast (point-to-point communication) cell to the output ports, copying a multicast (point-to-multipoint communication) cell, and translating the header (VPI/VCI) of the cell. The look-up memory 220 includes control information for determining whether to copy the multicast cells to the respective subscriber ports, and the translated header values (VPI/VCI) for the respective multicast cells. The subscriber output buffers 231 to 234 are composed of first-in-first-out (FIFO) memories for storing the cells prior to transferring the cell information to the subscriber ports. In practice, the buffers may be included in transmission elements for transferring the cells to the subscriber ports.

Figure 3:
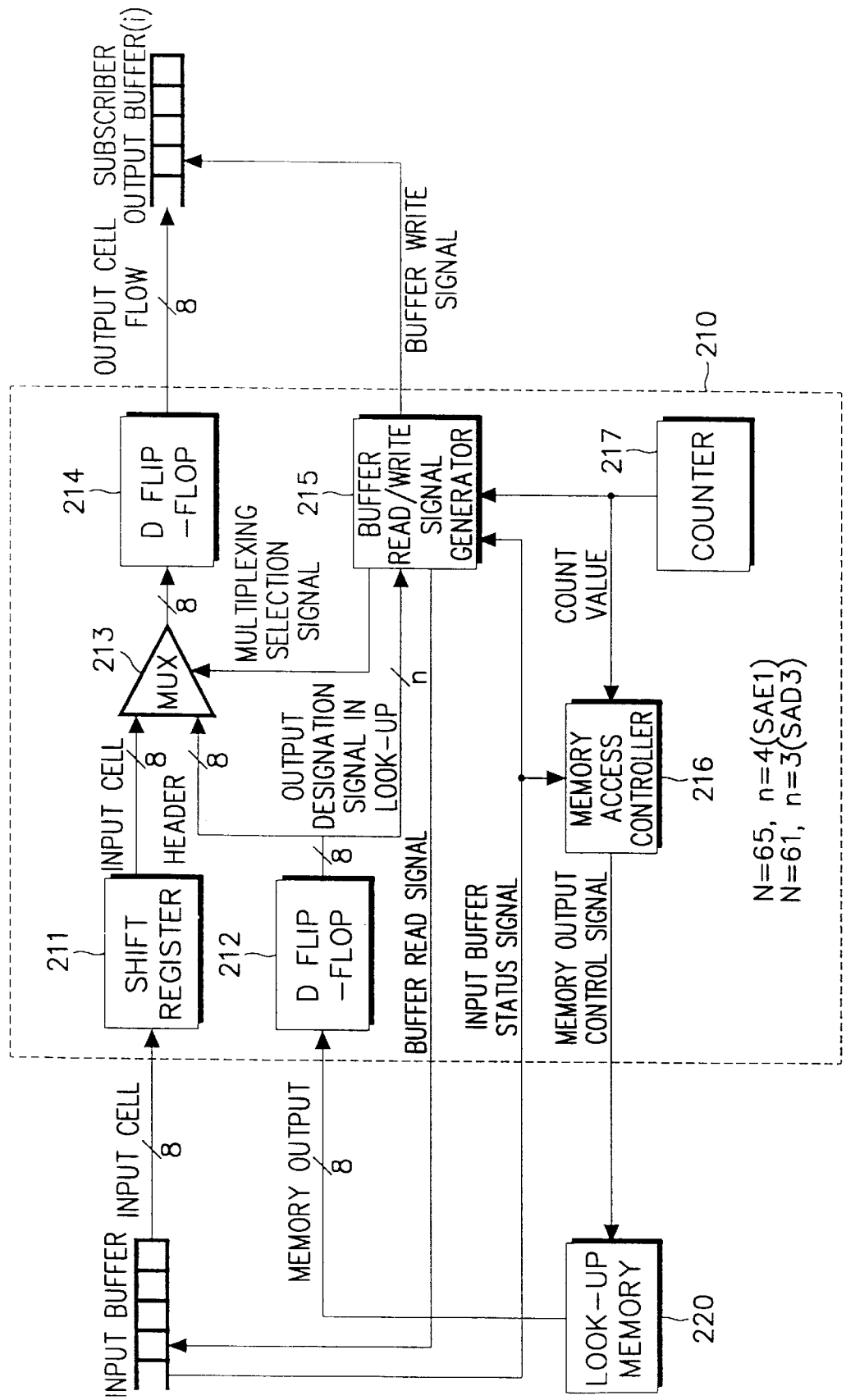
FIG. 3 is a detailed block diagram of a cell copy and header translation controller of the cell processing apparatus according to the principles of the present invention.

Referring to FIG. 3, the cell copy and header translation controller 210 includes a counter 217 for generating a sequential control signal, a control logic circuit for connecting a central processing unit (CPU) (not shown) to the look-up memory 220 to change the control information stored into the look-up memory 220, and a logic circuit for receiving the multicast cells. In addition, the cell copy and header translation controller 210 includes a logic circuit which generates a write signal for demultiplexing nonmulticast (i.e., point-to-point communication) input cells and generates a write signal for copying the multicast input cells, and a shift register 211 for maintaining the cell information for a predetermined time.

FIG. 3 illustrates a cell copy and header translation controller (210) of the cell processing apparatus according to the principles of the present invention. The cell copy and header translation controller 210 includes a shift register 211, a first D flip-flop 212, a multiplexer MUX 213, a second D flip-flop 214, a buffer read/write signal generator 215, a memory access controller 216, and a counter 217.

The counter 217 may be composed of a base-65 counter, since the sum of the time for processing 4-byte header of the ATM cell composed of 53-byte unit with respect to the respective ports and the time for transferring a fifth byte (header protection byte) of the header and a 48-byte payload becomes 65 bytes (that is, 4 bytes×4 bytes+49 bytes=65 bytes). However, it is preferable that the counter 217 be composed of a base-69 counter (i.e., 65 bytes+1 byte margin×4 ports) to spare time margin.

The memory access controller 216 connected to the look-up memory 220 is disclosed in detail in Korean patent application No. 94/30266, entitled "Memory Access Control Method in Asynchronous Transfer Mode Switching System", filed by the applicant, and incorporated by reference herein. The buffer read/write signal generator 215 generates the write signals to the respective subscriber ports sequentially or simultaneously, according to a count value from the counter 217. The shift register 211 is composed of eight flip-flops and is used to shift 8-bit data in response to a clock, and delay the data while the cell copy and header translation controller 210 determines whether to generate the header look-up signal and the write signals.

In the meantime, the header of the input cell has a check bit for determining whether the cell is a singlecast (point-to-point communication) cell or a multicast (point-to-multipoint communication) cell. Upon receipt of an ATM cell including such a check bit, the cell processing apparatus according to the present invention processes the input cell as illustrated in FIG. 5.

Figure 5:
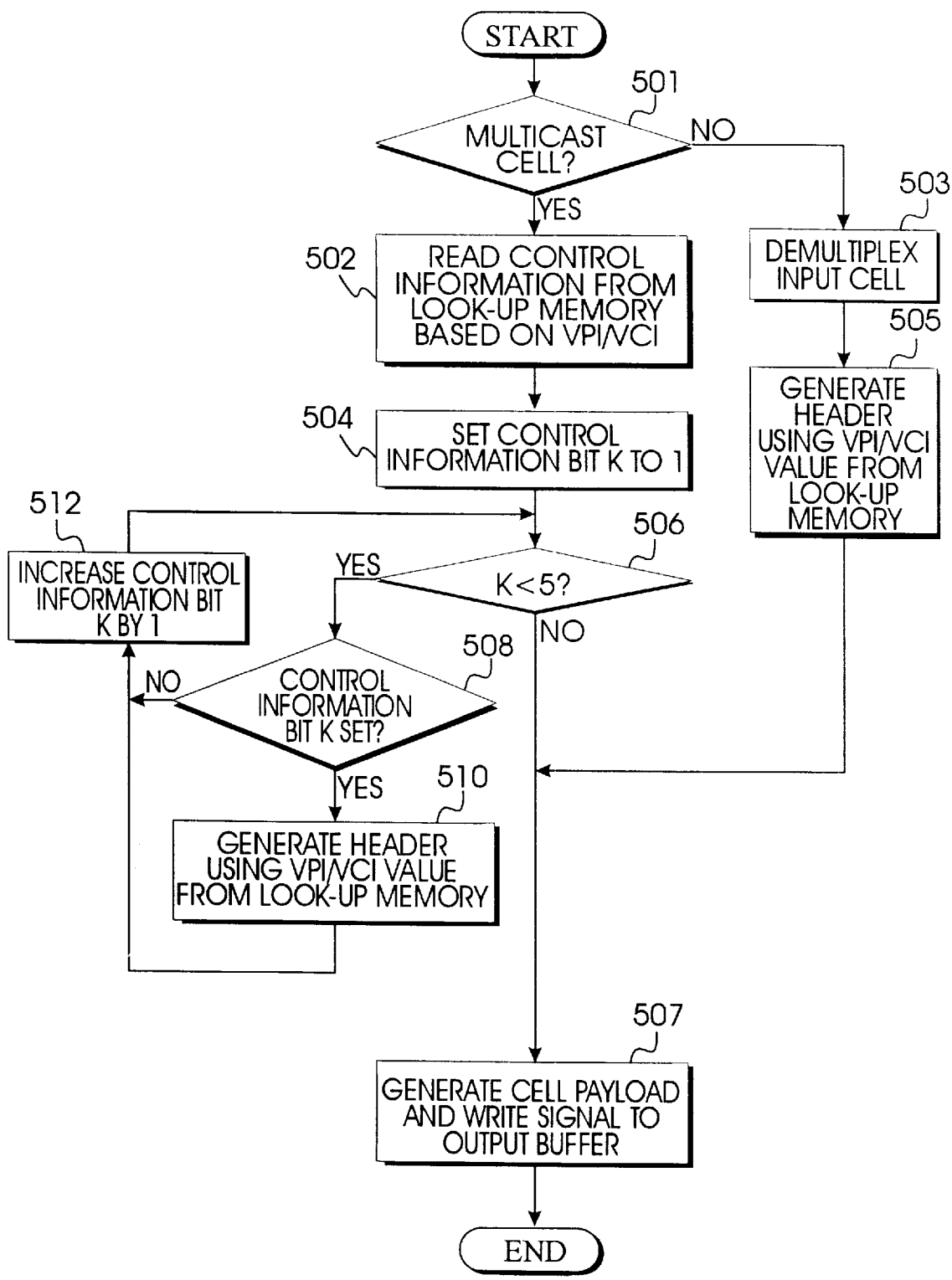
FIG. 5 is a flow chart of a cell copy and demultiplexing procedure according to the principles of the present invention.

Referring to FIG. 5, the cell copy and header translation controller 210 determines whether an input ATM cell is a multicast cell or a singlecast (point-to-point communication) cell based on the check bit included in the header at step 501. If the input cell is the point-to-point communication cell, the cell copy and header translation controller 210 demultiplexes the cell and transfers the demultiplexed cell to a corresponding one of the subscriber ports at step 503.

Figure 4A:
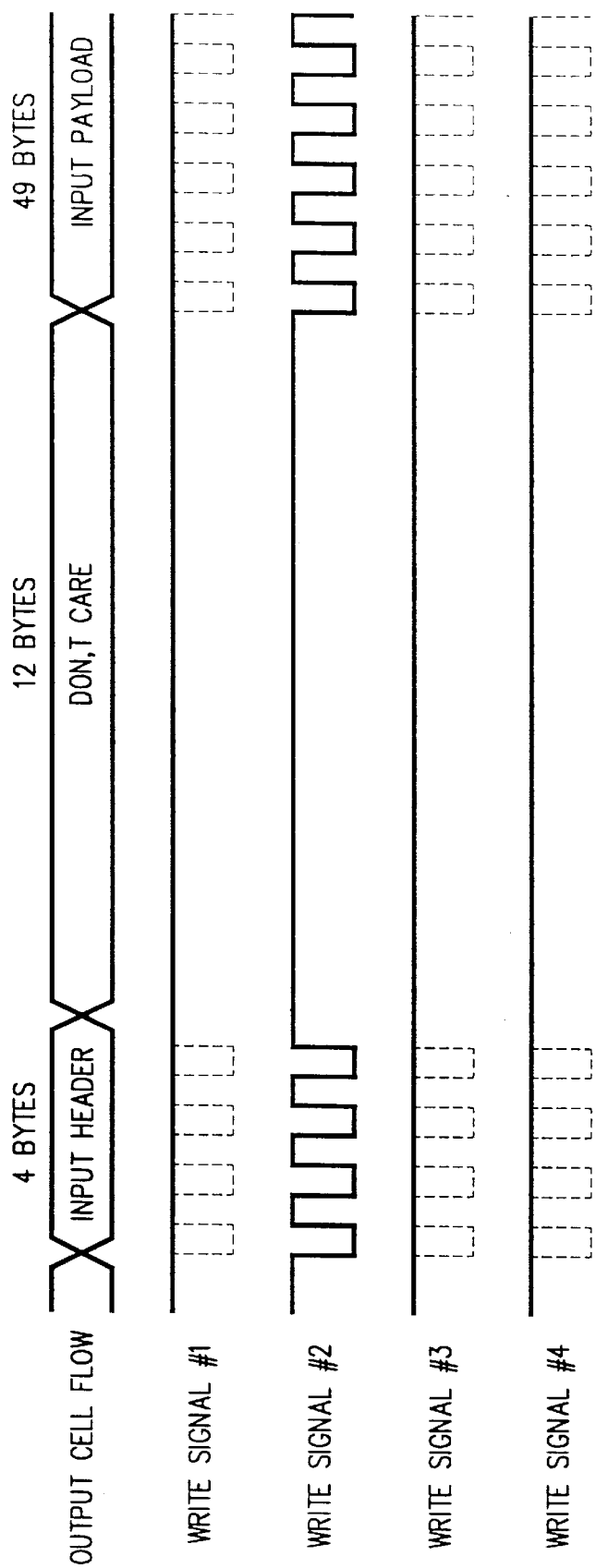
FIGS. 4A to 4C are timing diagrams for a cell copy and demultiplexing operation by means of the cell copy and header translation controller according to the principles of the present invention.

FIG. 4A illustrates a timing diagram of the input data and the write signals which are to be supplied to the subscriber output buffers 231–234, in case that a point-to-point cell is demultiplexed port #2. Here, all the write signals are generated simultaneously in response to the count value output of the counter 217, irrespective of the ports, as represented by the dot lines. The reason the write signals are generated at the same time is because the header of the input cell is generated at this point.

When the input cell is a multicast cell that should be copied, the cell copy and header translation controller 210 reads, at step 502, the output control information bit (4 bits) from the look-up memory 220 based on the VPI/VCI value of the cell. The cell copy and header translation controller 210 then sets output control information bit K to an initial value (i.e., one) at step 504. After the output control information bit K is set to an initial value (i.e., one), the cell copy and header translation controller 210 determines whether the control information bit K is less than a predetermined value (i.e., five) at step 506. If the control information bit K is less than the predetermined value (i.e., five), the cell copy and header translation controller 210 determines whether the control information bit K has been set to determine the ports for copying the cell at step 508. If the control information bit K has been set to determine the ports for copying the cell at step 508, the cell copy and header translation controller 210 reads, at step 510, the output VPI/VCI value of the respective ports from the look-up memory 520 and transfers the VPI/VCI value to the subscriber output buffers 231 to 234.

Thereafter, the control information bit K is increased by a constant value (i.e., one) at step 512. Likewise, if the control information bit K has not been set to determine the ports for copying the cell at step 508, the cell copy and header translation controller 210 increases the control information bit K by the constant value, and then proceeds to step 506 to repeat the setting of the control information bit K until the control information bit K is no longer less than the predetermined value (i.e., five). When the control information bit K is not less than the predetermined value (i.e., five) at step 506, the cell copy and header translation controller 210 generates a cell payload and in turn, header write signals according to the count value output of the counter 217, at step 507.

Figure 4B:
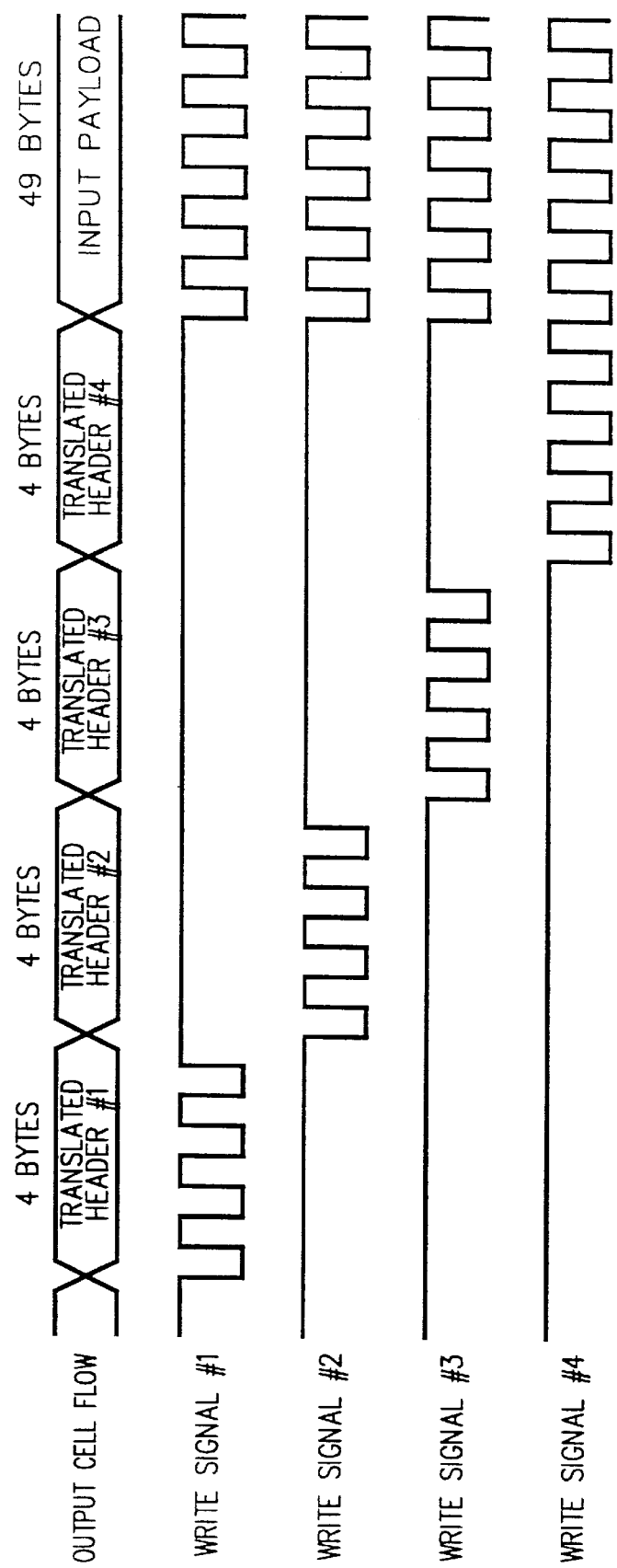
Figure 4C:
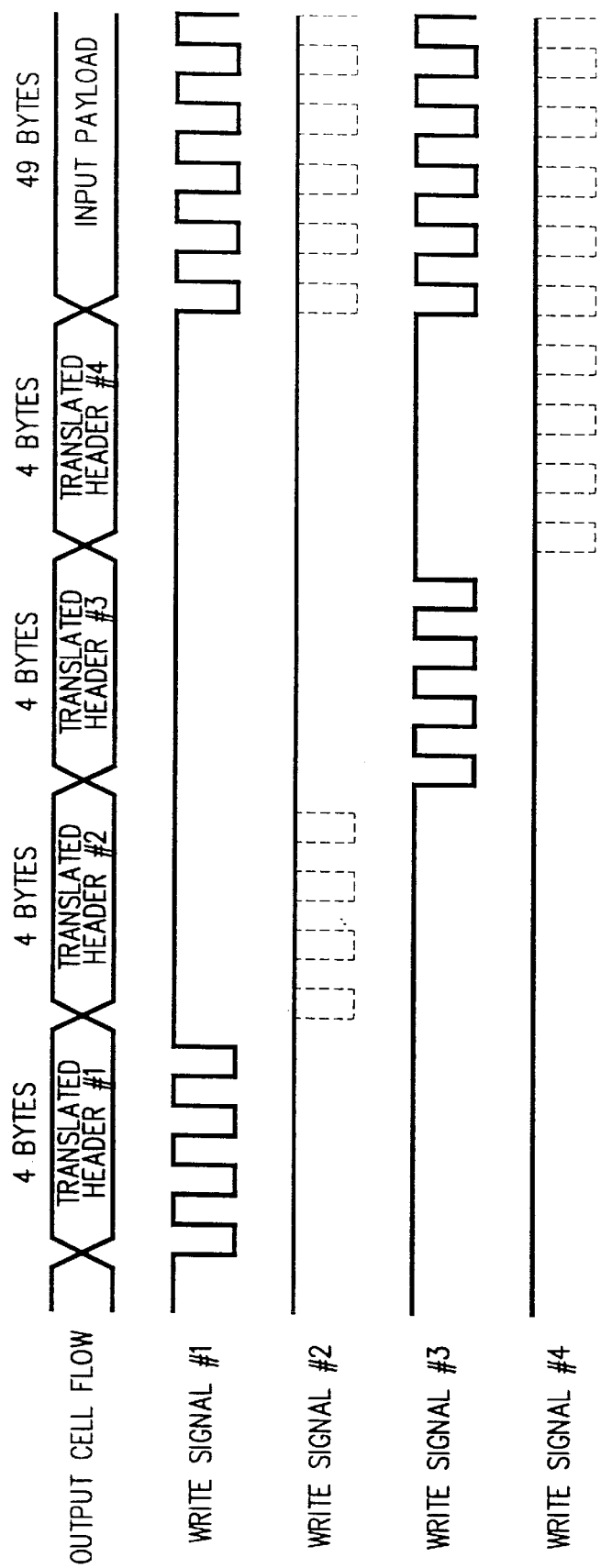

FIG. 4B illustrates a timing diagram of the input data and the write signals in case that the control bits are set so as to copy the cell with respect to all the ports. FIG. 4C illustrates a timing diagram of input data and the write signals in case that the cell is copied with respect to port No. 1 and port No. 3. Here, the respective translated header information is composed of 4 bytes and the payload is composed of 49 bytes, as illustrated.

In the meantime, if the input cell is not a multicast cell at step 501, the cell copy and header translation controller 210 demultiplexes the input cell at step 503, and then generates the header from the VPI/VCI input. Thereafter, the cell copy and header translation controller 210 generates the header write signals, at step 506, and transfers the data for 12-byte clock time in order to adjust the control timing for the multicast cell. In this manner, the cell copy and header translation controller 210 first reads 4 bytes, and then reads the remaining bytes after the delay of 12 clock time. Upon completion of generating the header, the 49-byte payload is generated and the write signals are generated to the ports at which the write signals are generated with respect to the header, at step 507.

Table 1 and Table 2 illustrate the control information stored in the look-up memory 220, respectively. Specifically, Table 1 illustrates the control information with respect to the multicast cell corresponding to the E1 subscriber board SAE1, and Table 2 illustrates the control information with respect to the multicast cell corresponding to the DS3 subscriber board SAD3.

TABLE 1

| ADD | MSB | bit6 | bit5 | bit4 | bit3 | bit2 | bit1 | LSB |
|-----|-----|------|------|------|------|------|------|-----|
| 00–03 |   |   |   |   | Don't care |   |   |   |
| 04  | 0   | 0    | 0    | 0    | Port 3 | Port 2 | Port 1 | Port 0 |
| 05  |     |      |      |      | Port 0 VPI |   |   |   |
| 06  |     | Port 0 VPI |  |   |   |   | Port 0 VCI |   |
| 07  |     |      |      |      | Port 0 VCI |   |   |   |
| 08  |     | Port 0 VCI |  |   | 0 | 0 | 0 | 0 |
| 09  |     |      |      |      | Port 1 VPI |   |   |   |

TABLE 1-continued

| ADD | MSB | bit6 | bit5 | bit4 | bit3 | bit2 | bit1 | LSB |
|---|---|---|---|---|---|---|---|---|
| 0a | | Port 1 VPI | | | | Port 0 VCI | | |
| 0b | | | | | Port 1 VCI | | | |
| 0c | | Port 1 VCI | | | 0 | 0 | 0 | 0 |
| 0d | | | | | Port 2 VPI | | | |
| 0e | | Port 2 VPI | | | | Port 2 VCI | | |
| 0f | | | | | Port 2 VCI | | | |
| 10 | | Port 2 VCI | | | 0 | 0 | 0 | 0 |
| 11 | | | | | Port 3 VPI | | | |
| 12 | | Port 3 VPI | | | | Port 3 VCI | | |
| 13 | | | | | Port 3 VCI | | | |
| 14 | | Port 3 VCI | | | 0 | 0 | 0 | 0 |
| 15–1f | | | | | Don't care | | | |

TABLE 2

| ADD | MSB | bit6 | bit5 | bit4 | bit3 | bit2 | bit1 | LSB |
|---|---|---|---|---|---|---|---|---|
| 00 | 0 | 0 | 0 | 0 | 0 | Port 2 | Port 1 | Port 0 |
| 01 | | | | | Port 0 VPI | | | |
| 02 | | Port 0 VPI | | | | Port 0 VCI | | |
| 03 | | | | | Port 0 VCI | | | |
| 04 | | Port 0 VCI | | | 0 | 0 | 0 | 0 |
| 05 | | | | | Port 1 VPI | | | |
| 06 | | Port 1 VPI | | | | Port 1 VCI | | |
| 07 | | | | | Port 1 VCI | | | |
| 08 | | Port 1 VCI | | | 0 | 0 | 0 | 0 |
| 09 | | | | | Port 2 VPI | | | |
| 0a | | Port 2 VPI | | | | Port 2 VCI | | |
| 0b | | | | | Port 2 VCI | | | |
| 0c | | Port 2 VCI | | | 0 | 0 | 0 | 0 |
| 0d–df | | | | | Don't care | | | |

The ATM switching system as shown in FIG. 1 having a cell processing apparatus of the invention incorporated therein will now be described as follows. First, the cells transferred from a cell switching assembly (CSA) 110 to multiplexers/demultiplexers (D1MA) 121 and 122 for the E1-class subscribers are transferred to all the subscriber boards (SAE1) 131 and 132 or to a particular board according to whether the cell is a multicast cell. The subscriber boards (SAE1) 131 and 132 demultiplex and transfer the cell to one of four ports, in case that the cell is the point-to-point commumication cell. However, if the cell is the multicast cell, the cell is copied and the header of the cell is translated based on the look-up. In this manner, the multicast cell may be selectively copied and the header of the cell is translated. Further, even when the cell is transferred from the cell switching assembly 110 to a multiplexer/demultiplexer (D3MA) 123 for the DS3-class subscriber, the cell is demultiplexed or copied with respect to three ports in the subscriber board SAD3, in the same manner as described above.

As can be appreciated from the foregoing descriptions, even if a plurality of medium and low-speed subscribers are connected to one switch port, the ATM switching system of the invention can provide the point-to-multipoint communication service. In other words, since the ATM switching system of the invention does not copy the cell at the switch, it is possible to expand the number of the medium and low-speed subscribers without restriction. Further, the apparatus of the invention processes the point-to-point communication cell and the point-to-multipoint communication cell in the same manner. Thus, the cell control logic circuit is sequentially controlled by the counter, so that the cell processing time may be constant, thereby resulting into a reduction of variation of the cell delay time. In addition, the apparatus of the invention does not translate the header of the point-to-point communication cell. Thus, in case that the ATM switching system mostly provides the point-to-point communication service, the apparatus of the invention does not have to control the look-up memory to save time.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An asynchronous transfer mode switching system for point-to-point and point-to-multipoint communications, said systems, comprising:

a cell switching assembly having at least one switch port where a plurality of fixed-size cells are inputted, each of said cells including a header having a check bit identifying whether the cell is a point-to-point cell or else is a point-to-multipoint cell;

a subscriber board having a plurality of subscriber ports; and a cell processing apparatus installed in said subscriber board, said cell processing apparatus comprising:
means for determining whether a communication cell corresponds to a one of the point-to-point cell and the point-to-multipoint cell;
means for copying a communication cell from said switch port;
means for transferring the communication cell copied to corresponding subscriber ports connected to said subscriber board when the communication cell from said switch port corresponds to a point-to-multipoint cell; and
means for demultiplexing the communication cell from said switch port and transferring the demultiplexed cell to a corresponding one of said subscriber ports when the communication cell from said switch port corresponds to a point-to-point cell;

said cell processing apparatus further comprising a cell copy controller comprising a look-up memory for storing control information for determining whether to copy the communication cell from said switch port and a cell copy controller for copying the communication cell from said switch port and transferring the communication cell copied to the subscriber ports according to said control information stored in the look-up memory, said cell controller further comprising:
a means for translating the header of the communication cell based on the control information stored in the look-up memory;
a means for transferring the communication cell having the translated header to at least one of the subscriber ports according to said control information;
a means for separating the translated header and a remaining payload; and
a means for transferring the separated header and payload to a corresponding one of said subscriber ports when transferring the communication cell having the translated header.

2. The asynchronous transfer mode switching system of claim 1, further comprising a plurality of subscriber output buffers corresponding to the respective subscriber ports.

3. The asynchronous transfer mode switching system of claim 2, wherein said cell copy controller further comprises:
- a means for generating write signals for a corresponding one of said subscriber ports to temporarily store in corresponding subscriber output buffers those cells not transferred to a one of said subscriber ports; and
- a means for thereafter transferring not-transferred cells to the subscriber ports when transferring the separated header and remaining cells to the subscriber ports.

4. A cell processing apparatus of an asynchronous transfer mode (ATM) switching system including a cell switching assembly having at least one switch port for transferring an ATM cell, and a subscriber board having a plurality of subscriber ports, comprising:
- installed in said subscriber board, a look-up memory for storing control information for determining whether to cope an incoming communication cell from said switch port; and
- installed in said subscriber board, a cell copy controller comprising:
  - a means for copying the communication cell from said switch port and transferring communication cells copied to the subscriber ports according to said control information stored in the look-up memory;
  - a means for translating a header of the communication cell based on the control information stored in the look-up memory, and a means for transferring the communication cell having the translated header to at least one of the subscriber ports according to said control information; and
  - a means for separating the translated header and a remaining payload and transferring the separated header and payload to a corresponding one of said subscriber ports when transferring the communication cell having the translated header.

5. The cell processing apparatus of claim 4, further comprising a plurality of subscriber output buffers corresponding to the respective subscriber ports.

6. The cell processing apparatus of claim 5, wherein said cell copy controller further comprises a means for generating write signals for a corresponding one of said subscriber ports to temporarily store in corresponding subscriber output buffers cells not transferred to the subscriber ports and means for thereafter transferring to the subscriber ports the cells not transferred to the subscriber ports.

7. A cell processing method, comprising the steps of:
(1) determining for an asynchronous transfer mode (ATM) switching system including a cell switching assembly having at least one switch port for transferring an ATM cell, the cell including a header having a check bit identifying whether the cell is a point-to-point cell or else is a point-to-multipoint cell, and a subscriber board having a plurality of subscriber ports, whether an incoming communication cell from said switch port corresponds to a one of a point-to-point cell and a point-to-multipoint cell;
(2) when the communication cell corresponds to a point-to-multipoint cell, translating a header included in the communication cell according to a control datum;
(3) selecting a subscriber port based on the header translation of the immediately preceding step;
(4) transferring the communication cell to the subscriber port selected in the immediately preceding step;
(5) demultiplexing the communication cell to transfer the demultiplexed cell to a predetermined one of said subscriber ports, when the communication cell corresponds to the point-to-point cell; and
(6) copying the communication cell to transfer communication cells copied to at least one of said subscriber ports, when the communication cell corresponds to the point-to-multipoint cell.

* * * * *